United States Patent [19]

Ebenhoech et al.

[11] 3,918,985

[45] Nov. 11, 1975

[54] TRANSPARENT YELLOW IRON OXIDE PIGMENT

[75] Inventors: Franz Ludwig Ebenhoech, Ludwigshafen; Dietmar Werner, Weisenheim; Gustav Bock, Neustadt; Gerd Wunsch, Speyer; Karl Opp, Heidelberg; Werner Ostertag, Willstaett, all of Germany

[73] Assignee: BASF Aktiengesellschaft, Ludwigshafen (Rhine), Germany

[22] Filed: Aug. 28, 1974

[21] Appl. No.: 501,042

[52] U.S. Cl. ............................... 106/304; 423/417
[51] Int. Cl.² ........................................... C09C 1/24
[58] Field of Search .......... 106/304, 288 B; 423/417

[56] References Cited

UNITED STATES PATENTS

| | | | |
|---|---|---|---|
| 2,719,077 | 9/1955 | Schlecht et al. | 423/417 |
| 3,112,179 | 11/1963 | Schmeckenbecher | 423/417 |
| 3,469,942 | 9/1969 | Henneberger | 106/304 |

*Primary Examiner*—Patrick P. Garvin
*Assistant Examiner*—J. V. Howard
*Attorney, Agent, or Firm*—Johnston, Keil, Thompson & Shurtleff

[57] ABSTRACT

A transparent iron oxide pigment which is X-ray amosphous, and has the formula $C_{0.01-0.05} \cdot Fe_2O_{2.9_{60}-2.999}$. The new pigment can be used for the manufacture of metallic-effect surface coatings.

5 Claims, No Drawings

TRANSPARENT YELLOW IRON OXIDE PIGMENT

This application discloses and claims subject matter described in German Patent Application P 23 44 196.5, filed Sept. 1, 1973, which is incorporated herein by reference.

Iron oxide pigments are regarded as transparent if a dispersion of pigment powder and a clear resin produces transparent coatings. This is the case, inter alia, if the particle size of the pigments is less than the wavelength of visible light. The transparency of a pigment is determined, according to L. Gall, Farbe und Lack 72, 1078–1085 (1966), by reflectance measurements of the colored materials, using a filter photometer. Visually, the transparency of a dispersion can be assessed by spreading a clear coating pigmented in a specified manner by means of a knife coater on white paper which has a black strip running across it, and is then baked. If the black strip is clearly visible under the film, the pigment is regarded as transparent.

The demand for transparent pigments has been rising rapidly for some years. This is attributable to the increasing use of transparent pigments in the paints industry, in wood finishes, and in the graphic trade. Amongst these pigments, transparent red iron oxide pigments play a special role. They are employed predominantly in the automotive industry in metallic-effect finishes, where the heat stability of $Fe_2O_3$, its UV stability and its relatively attractive price make red iron oxide a popular pigment.

The industrial manufacture of commercially available transparent red iron oxide almost exclusively uses the "wet process", that is to say the $Fe_2O_3$ pigment is obtained by precipitating iron(II) hydroxide or iron(II) carbonate from aqueous iron(II) salt solutions, oxidizing the iron(II) hydroxide to iron(III) hydroxide or iron(III) oxide and then drying the filtered and washed product by heating. In order to produce fine pigment particles U.S. Pat. No. 2,558,302 describes methods of producing transparent iron oxide by suitable control of the temperature and choice of the concentration of the solutions. German Pat. No. 1,219,612 and Japanese patent application 11,661/68 disclose how the size of the pigment particles can be controlled by addition of foreign substances.

As has already been mentioned, the color shade of all transparent iron oxide pigments hitherto available for surface coatings lies in the red region of the spectrum. The producers of red iron oxide have not been able to meet the need of the surface coatings industry for a yellow iron oxide. Admittedly it is known that iron hydroxide and hydroted iron oxide exhibit a yellow shade and can be manufactured in a transparent form by a wet process. However, because of their exceptionally poor heat stability, these pigments are unsuitable for practically all applications. As the temperature is raised (frequently at as low as 90°C), the iron hydroxide and hydrated iron oxide pigments eliminate water, which results in an immediate shade change from yellow to red.

It is an object of the present invention to provide a heat-stable transparent yellow pigment.

We have found that this object is achieved by an iron oxide pigment which is X-ray amorphous and has the formula $$Fe_2O_{2.960-2.999}C_{0.01-0.05}.$$

In accordance with the amorphous structure, the pigment does not have a simple stoichiometric formula and instead is characterized by a range of composition.

The transparent yellow pigment of composition $$Fe_2O_{2.960-2.999}C_{0.01-0.05}$$

can be manufactured by combustion of iron carbonyl, for which it is important that certain conditions should be observed. Not only iron carbonyl, but also iron carbonyl compounds, such as, for example, the volatile compound butadiene-iron carbonyl, can be employed in the process.

Further, we have found that the new iron oxide pigment can be manufactured by introducing into the combustion zone the iron carbonyl and/or another volatile iron carbonyl compound, which is to be combusted, and at least 0.5 m³ of oxygen, air and/or inert gases per mole of iron carbonyl, combusting the iron carbonyl and/or the other volatile iron carbonyl compound at temperatures of from 580° to 650°C using residence times of from 0.5 to 5 seconds and chilling the resulting iron oxide pigment, after it leaves the combustion zone, to temperatures below 250°C in the space of less than 2 seconds.

Accordingly, iron carbonyl is introduced in a highly diluted form into a combustion chamber whilst ensuring that the gas used for dilution contains at least the amount of oxygen stoichiometrically required for combusting the carbonyl. The combustion temperature should be not less than 580°C and not more than 650°C. The residence time of the carbonyl and of the combustion products in the stated temperature range should not exceed 5 seconds and not be less than 0.5 second. A further decisive aspect is the fact that after leaving the combustion chamber the product is chilled to temperatures below 250°C within the space of less than 2 seconds. Further, it is necessary to ensure that during combustion the carbonyl is thoroughly mixed with the combustion air, that is to say turbulence must prevail in the combustion chamber. This can be achieved, for example, by using the diluent gas, containing oxygen, to spray the liquid carbonyl or carbonyl vapor into the combustion chamber.

In addition to the amount of oxygen required for the combustion, at least 0.5 m³ of a diluent gas is introduced per mole of iron carbonyl. In principle, there is no upper limit to the dilution employed but it is desirable that the amount of diluent gas should not exceed 5 m³/mole of iron carbonyl.

The diluent gas can be any desired gas which is inert to the reactants or reaction products under the particular reaction conditions, such as nitrogen, argon and carbon dioxide, but also oxygen or air itself. As a rule, air is used as the source of oxygen in which case its content of gases other than oxygen is counted with the diluent gases. The diluent gas should preferably be at least partially an inert gas such as nitrogen or argon.

The combustion of the carbonyl in the reaction chamber can be carried out not only in the form described, but also in a fluidized bed. The bed consists of inert materials, for example particles of $Al_2O_3$. Surprisingly, iron oxide does not deposit on the fluidized bed particles when the combustion of the carbonyl is carried out in the bed and instead the oxide is obtained in the desired particle size and particle homogeneity.

If the temperature used lies outside the above range, temperatures below 580°C, on the one hand, give products which no longer exhibit the desired shade and are much more scattering than is acceptable with transparent pigments (transparency <5), whilst, on the other hand, at temperatures above 650°C, iron oxides with redder shades are produced, which become progressively more opaque with increasing temperature under the conditions specified. In every case, temperatures outside the range mentioned give products which do not correspond to the formula mentioned above.

The new pigment manufactured by combustion of carbonyl is obtained in an extremely loose form, that is to say with a bulk density of less than 0.05 g/cm³. It is X-ray amorphous, very finely divided, with average particle size of less than 200 μA, and can easily be dispersed in organic paint systems which is probably attributable to the fact that because of having been manufactured by pyrolysis the pigments do not carry any OH groups on the surface, whilst they do so in the case of pigments obtained from aqueous solutions. On dispersion, the pigments rapidly develop their full depth of color and are transparent and yellow. The cause of the yellow shade of the pigments is probably closely related to the fact that the new iron oxide pigment does not have a crystallographically homogeneous wellordered structure and instead, as a result of the incorporation of carbon and of Fe ions of lower valency than +3, the $Fe_2O_3$ lattice disintegrates to a loose accumulation of ions which coheres without a superposed crystallographic order. The fact that the material is not crystallographically homogeneous, which manifests itself in the X-ray diffraction diagram, is probably the most important reason for the tinctorial properties of the pigments according to the invention.

The iron oxide pigment according to the invention is used above all in metal coatings. The new pigment is very suitable for the production of metallic-effect coatings. In addition, it can also be used for th manufacture of printing inks and of transparent wood stains.

EXAMPLE 1

Iron carbonyl, $Fe(CO)_5$, is vaporized in a prevaporizer and introduced, using nitrogen as an inert carrier gas, into a combustion chamber, together with air, using a two-component nozzle. The amount of air is so chosen as to provide 700 l. of air per 100 g of carbonyl. The volume of the carrier gas is 300 l. The temperature in the combustion chamber is kept at 600°C. The carbonyl vapor and air are subjected to rapid and intense turbulent mixing. The residence time of the resulting combustion products in the combustion chamber averages 3 seconds. The loose pigment, of consistency resembling carbon black, is discharged from the combustion chamber through a water-cooled pipe where it is cooled to 150°C within the space of 1 second. The pigment is then isolated in a cyclone.

Chemical analysis showed the product to have the formula $Fe_2O_{2.96}C_{0.04}$. In a Debye-Scherrer diagram, the pigment showed no lines but only a halo, which indicated that it is X-ray amorphous. The measurement of the specific surface area of the powder gave a value of 150 m²/g. Electron-microscopic photographs showed the average particle size of the pigment to be between 50 and 100 A. The technological and optical properties of the pigment used to produce a pure shade (in a clear coating) were determined on alkyd-melamine resin coatings filled with 5% of pigment. The transparency, measured in accordance with the technique of measurement mentioned earlier, gave a value of 6.07. To determine the tinctorial properties when used as a pure shade, 10 μ thick coatings of the dispersion were applied over a white base. Thereafter, spectral reflectance measurements were carried out with the Cary 14 R instrument and evaluated at 1/1 standard depth. The tinctorial properties in a tinted coating were determined by blending the pure shade material with a baking finish (30% of $TiO_2$ RN 59 in alkyd-melamine resin) and opaque coatings of the colored material were produced and evaluated colorimetrically in the usual manner at 1/25 standard depth. The pure shade material gave a shade of 4.4 and the material based on a tinted coating gave a shade of 3.0, both on the CIE scale, that is to say the shade lies in the yellow region of the scale.

EXAMPLE 2

Iron carbonyl, $Fe(CO)_5$, vapor was injected by means of a carrier gas into an electrically heated reaction chamber in which $Al_2O_3$ particles were fluidized with air. The temperature inside the combustion chamber was 610° ± 5°C and was kept thereat by means of a temperature controller. The carbonyl-air ratio was so chosen as to provide 1,000 l of air per 50 g of carbonyl. The residence time of the combustion products was 2 seconds. The reaction product was then discharged from the combustion chamber through a short pipe into a liquid quenching device in which $CCl_4$ served as the quenching liquid. The details of the quenching operation were that $CCl_4$ was passed through the outer nozzle chamber of a two-component nozzle and the product together with the off-gases was blown through the inner nozzle. The iron oxide was chilled to 60°C in the space of less than 0.25 second. The iron pigment which was moist with $CCl_4$ was dried at 90°C. Chemical analysis showed the product to have the formula $Fe_2O_{2.97}C_{0.015}$.

Under the conditions of examination described in Example 1, the product showed a transparency of 5.75 and was yellow. It was X-ray amorphous and had a BET surface area of 155 m²/g.

We claim:

1. A transparent yellow iron oxide pigment which is amorphous according to X-ray diffraction, and has the formula $$C_{0.01-0.05} \cdot Fe_2O_{2.960-2.999}.$$

2. A process for the manufacture of a transparent yellow iron oxide pigment which has the formula $$C_{0.01-0.05} \cdot Fe_2O_{2.960-2.999},$$

wherein iron carbonyl and/or a volatile iron carbonyl compound is introduced in a finely divided state into a combustion zone with the amount of oxygen required for the combustion and, in addition, at least 0.5 m³ of diluent gas selected from oxygen, air and inert gaseous material per mole of iron carbonyl, the iron carbonyl and/or volatile iron carbonyl compound is burnt at a temperature of from 580° to 650°C with a residence time of from 0.5 to 5 seconds and the resulting iron oxide pigment, on leaving the combustion zone, is chilled to a temperature below 250°C in the space of less than 2 seconds.

3. A process as claimed in claim 2 wherein the carbonyl or carbonyl compound is sprayed in liquid or gaseous form into the combustion zone using the oxygen and diluent gas.

4. A process as claimed in claim 2 wherein at least part of the diluent gas is inert.

5. A process as claimed in claim 2 wherein a fluidized bed of inert material is present in the combustion zone.

* * * * *

UNITED STATES PATENT OFFICE
CERTIFICATE OF CORRECTION

PATENT NO. : 3,918,985
DATED : November 11, 1975
INVENTOR(S) : EBENHOECH et al

It is certified that error appears in the above-identified patent and that said Letters Patent are hereby corrected as shown below:

In the Heading, insert -- (30) Foreign Application Priority Data  September 1, 1973  Germany  P 23 44 196.5 --

In Column 3, Line 33, delete " for th manufacture " and substitute -- for the manufacture --

Signed and Sealed this

Sixteenth Day of November 1976

[SEAL]

*Attest:*

RUTH C. MASON
*Attesting Officer*

C. MARSHALL DANN
*Commissioner of Patents and Trademarks*